United States Patent
Johnson et al.

(10) Patent No.: US 6,273,530 B1
(45) Date of Patent: Aug. 14, 2001

(54) TOE-IN/TOE-OUT ADJUSTMENT MECHANISM

(75) Inventors: Gary Dean Johnson, Reinbeck; Robert James White; Bradley Thomas Cote, both of Waterloo, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/478,379

(22) Filed: Jan. 6, 2000

(51) Int. Cl.$^7$ .............. B60S 1/62; B62D 25/16; B62G 23/44; F16H 7/12

(52) U.S. Cl. .............. 305/116; 305/125; 305/143; 305/145; 305/153; 305/120

(58) Field of Search .............. 305/116 I, 124, 305/125, 129, 143, 145, 153, 154, 155, 120, 127

(56) References Cited

U.S. PATENT DOCUMENTS

| | | | |
|---|---|---|---|
| 3,275,386 | * | 9/1966 | Bexten .............. 305/145 |
| 4,405,026 | * | 9/1983 | Merrifield .............. 305/116 |
| 4,537,267 | | 8/1985 | Satzler .............. 180/9.1 |
| 4,596,298 | * | 6/1986 | Heki et al. .............. 305/127 |
| 4,834,478 | * | 5/1989 | Stevens et al. .............. 305/124 |
| 5,072,800 | * | 12/1991 | Price .............. 305/124 |
| 5,127,714 | * | 7/1992 | Satzler .............. 305/116 |
| 5,293,948 | * | 3/1994 | Crabb .............. 305/116 |
| 5,639,148 | | 6/1997 | Sheidler .............. 305/116 |
| 5,927,412 | * | 7/1999 | Crabb .............. 305/116 |

FOREIGN PATENT DOCUMENTS

| | | | | |
|---|---|---|---|---|
| 1493528 | * | 7/1989 | (SU) .............. | 305/120 |
| 94/23986 | * | 10/1994 | (WO) .............. | 305/124 |

OTHER PUBLICATIONS

Deere & Company Technical Manual entitled "8100T, 8200T, 8300T and 8400T Tractors Repair", cover and pp. 80–05–3 and 4, 80–10–3, and 80–15–4, John Deere Waterloo Works TM1621 (Jul. 10, 1997) printed in the U.S.A.

* cited by examiner

*Primary Examiner*—S. Joseph Morano
*Assistant Examiner*—Jason R. Bellinger

(57) ABSTRACT

The adjustment mechanism of the present invention is mounted to a frame and comprises an alignment cam that is pivotally mounted to the frame by a tension link pivot pin. The alignment cam is provided with an actuating arm that is coupled to a longitudinally extendible adjusting member. The longitudinally extendible adjusting member comprising a screw jack. A tension link is pivotally mounted to the tension link pivot pin. Camming surfaces on the alignment cam are skewed with respect to the transverse axis defined by the tension link pivot pin so that rotation of the alignment cam twists the tension link and thereby the idler wheel predominately about a vertical axis. Albeit to a lesser degree, rotation of the alignment cam also twists the tension link and idler about a longitudinally extending horizontal axis. Therefore by extending or retracting the screw jack, the toe-in/toe-out orientation of the idler wheel can be adjusted.

20 Claims, 3 Drawing Sheets

TOE-IN/TOE-OUT ADJUSTMENT MECHANISM

BACKGROUND OF THE INVENTION

1. Field of the Invention

The invention is directed to an adjustment mechanism for adjusting the toe-in/toe-out orientation of a wheel. It is particularly well adapted for adjusting the toe-in/toe-out orientation of an idler on a belted tracked vehicle.

2. Description of the Prior Art

Track vehicles comprise a vehicle main frame having a track frame extending therefrom. An engine powers a transmission that drives two drive wheels extending out each side of the vehicle. The track frame is provided with two idlers spaced along a longitudinal axis from the drive wheels. The track frame has left and right sides that may be rigidly joined together, or joined together by an equalizer bar or axle. A track is entrained about each drive wheel/idler pair. Track rollers may also extend downwardly from the track frame to run on the track an distribute the weight of the vehicle. The track can be conventional steel crawler chain to which grouser plates are attached, rubber belted tracks of the type used on agricultural tractors, or ladder tracks wherein a flexible cables or chains are coupled to one another by transversely extending members.

For any track vehicle to work properly, the track must be correctly tensioned and the idler wheel correctly oriented relative to the driven wheel. This is especially true with belted track tractors because of the high tension loads. With the Deere 8000T series of belted track tractors, manufactured and marketed by the assignee of the present application, the idler is rotatively mounted to a tension link. The idler defines a transverse axis. The tension link in turn is pivotally coupled to a J-link. The pivot axis of the tension link relative to the idler is parallel to the transverse axis of the idler. The J-link in turn is pivotally coupled to the track frame. The J-link is pivotable about a vertical axis. The J-link can be pivoted and locked in place by two screws extending inwardly from the sides of the track frame. By adjusting the position of the idler wheel about the vertical axis relative to the track frame the toe-in/toe-out orientation of the idler can be adjusted.

SUMMARY OF THE INVENTION

It is an object of the present invention to provide a compact, simple and robust adjustment mechanism for controlling the toe-in/toe-out orientation of the idler in a tracked vehicle.

The adjustment mechanism of the present invention is mounted to a frame and comprises an alignment cam having a tension link pivot pin. The alignment cam and tension link pivot pin being either a single integral part, or two separate parts. The alignment cam is provided with an actuating arm that is coupled to a longitudinally extendible adjusting member. The longitudinally extendible adjusting member comprising a screw jack. A tension link is pivotally mounted to the tension link pivot pin. Camming surfaces on the alignment cam are skewed with respect to the transverse axis defined by the tension link pivot pin so that rotation of the alignment cam twists the tension link and thereby the idler wheel predominately about a vertical axis. Albeit to a lesser degree, rotation of the alignment cam also twists the tension link and idler about a longitudinally extending horizontal axis. Therefore by extending or retracting the screw jack, the toe-in/toe-out orientation of the idler wheel can be adjusted.

DETAILED DESCRIPTION

Figure 1:
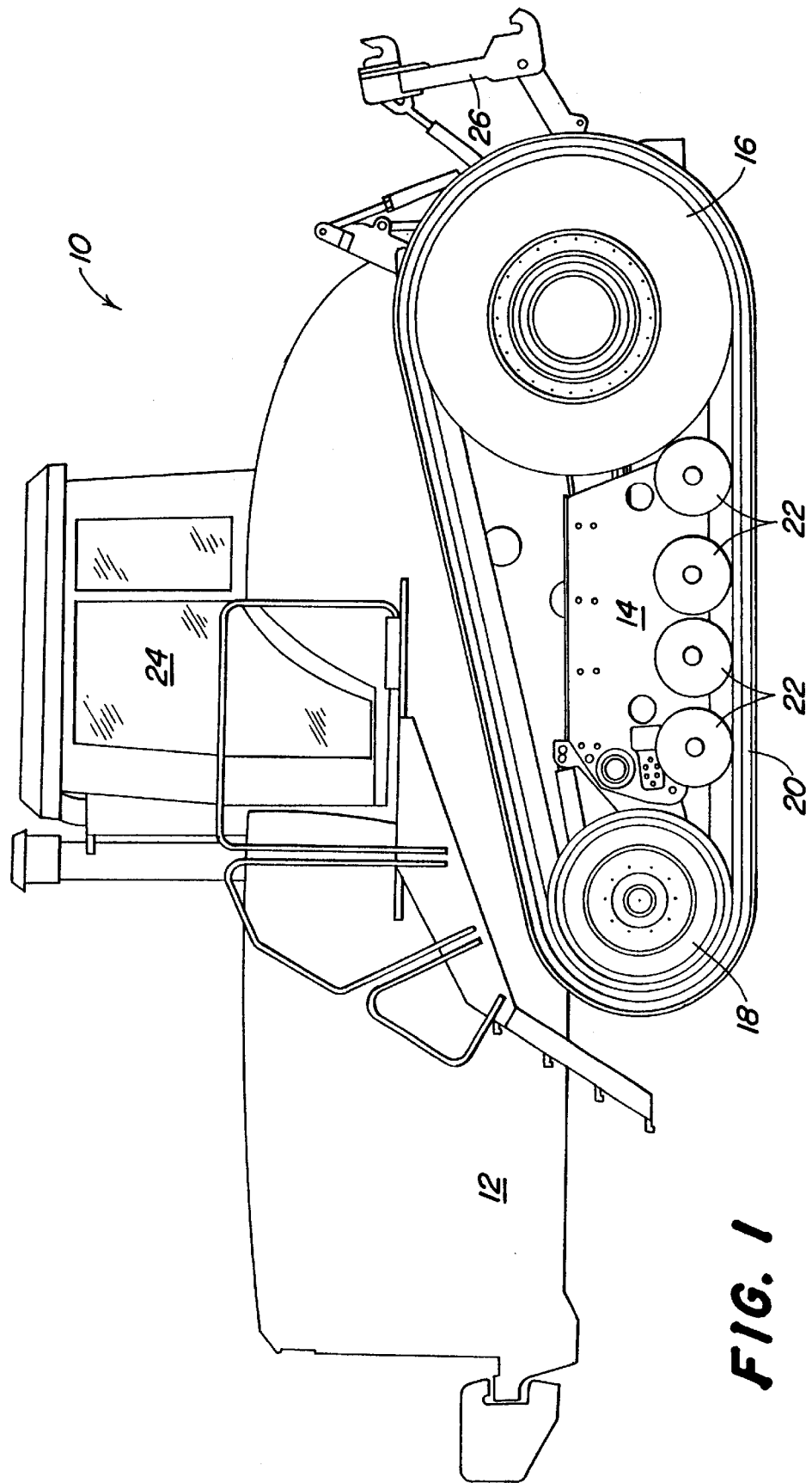
FIG. 1 is a side view of a track vehicle having the present invention

FIG. 1 illustrates a large track vehicle 10 having a main frame 12 and a track frame 14. The vehicle is provided with a pair of drive wheels 16 and a pair of idler wheels 18. A track 20 comprising an inextensible elastomeric belt is entrained about the drive wheels 16 and the idler wheels 18. The exterior of the belt is provided with ground engaging cleats and the interior of the belt is provided with centering guide lugs. The track frame is also provided with midwheels 22 for better distributing the load of the vehicle on the ground. The track frame maybe provided with a equalizer bar to distribute load between the left and right segments of the track frame. The drive wheels 16 are driven by an internal combustion engine and transmission, not shown, that are mounted to the main frame 12. The operation of the vehicle is controlled from operator's cab 24. The track vehicle 10 is also provided with an implement hitch 26.

Figure 2:
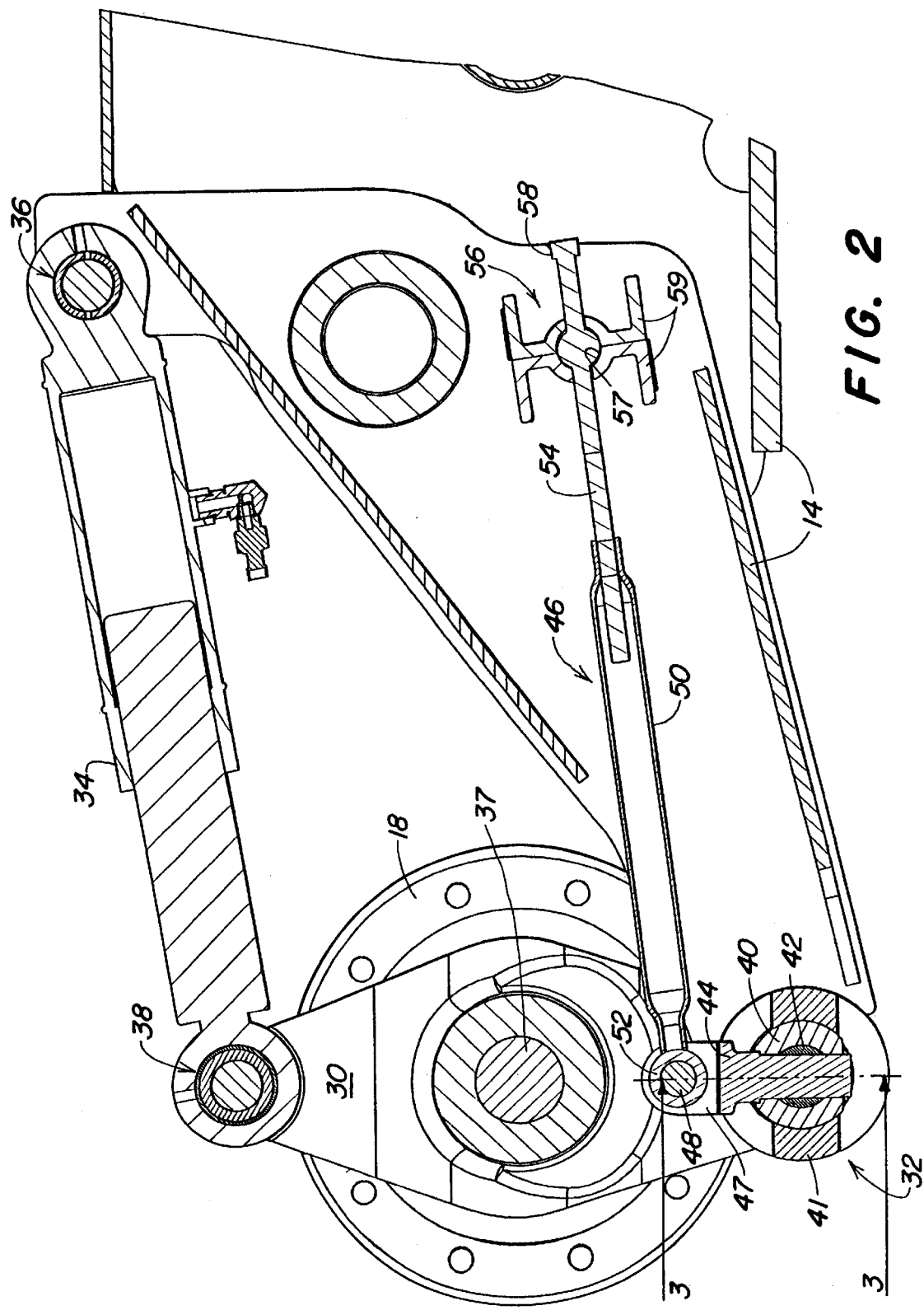
FIG. 2 is a cross sectional side view of the track tensioning and toe-in/toe-out system used on the tracked vehicle.
Figure 3:
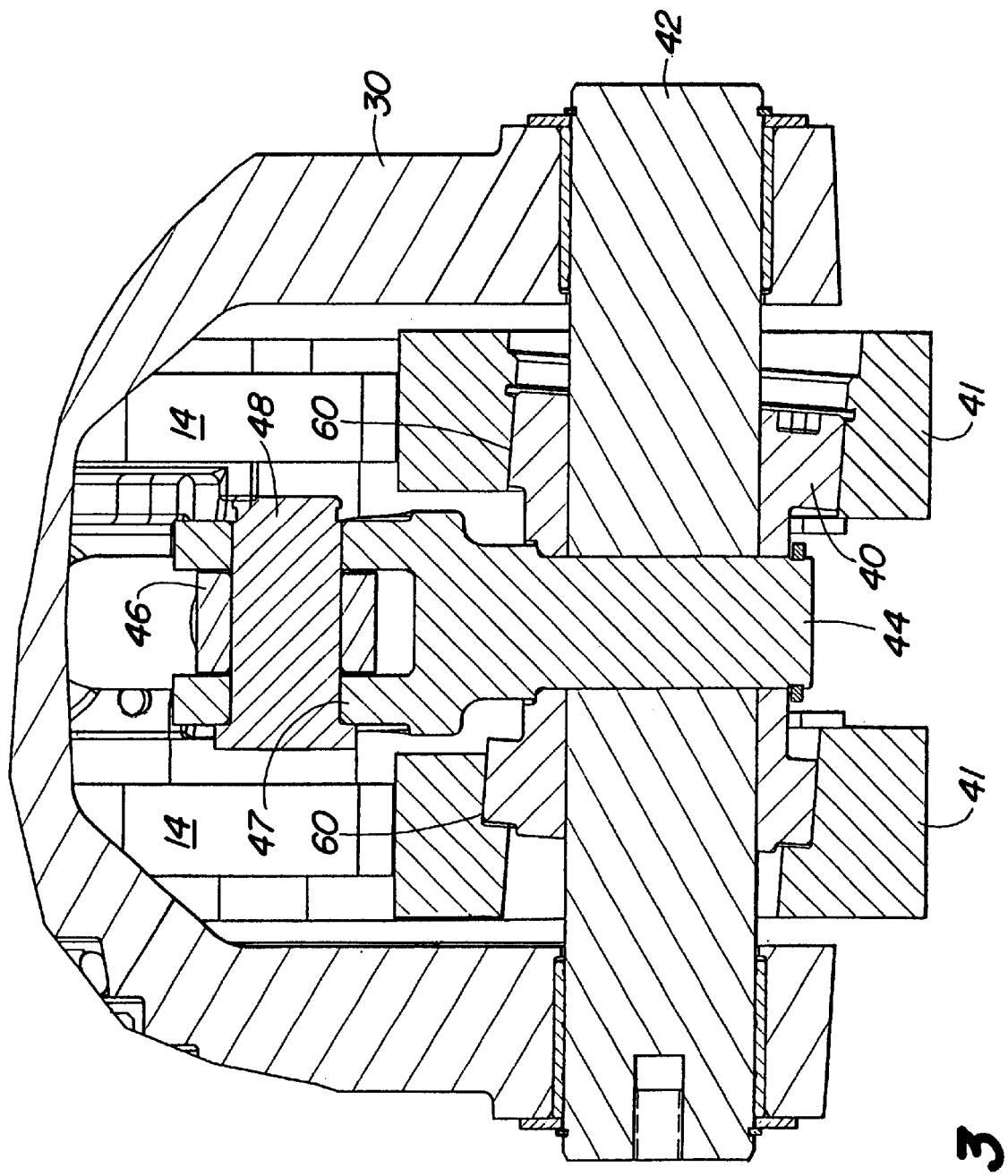
FIG. 3 is a cross sectional front view of the toe-in/toe-out system taken along line 3—3 in FIG. 2.

To tension the belt, the track frame is provided with a tension link 30, best illustrated in FIGS. 2 and 3, that is pivotally coupled to the track frame 14 at pivot 32. The top of the link is pivotally coupled to a hydraulic cylinder 34 which rotates tension link 30 about pivot 32 to control the tension in track 20. The hydraulic cylinder 34 is pivotally coupled to the track frame 14 at pivot 36 and to the tension link 30 at pivot 38. The idler wheel 18 is rotatively coupled to an axle 37 extending through the tension link between pivot 32 and pivot 38. By extending the hydraulic cylinder 34, the idler wheel 18 is moved away from the drive wheel 16 adding tension to the track 20. The hydraulic cylinder 34 is hydraulically coupled to an accumulator to maintain a more consistent pressure in the hydraulic cylinder and thereby a consistent tension on the track even when objects get trapped between the track and the wheels. The hydraulic cylinder forms a linear motor for pivoting the tension link, however other linear motor assemblies maybe acceptable for different applications.

Tension link pivot 32 is provided with a cylindrical transversely arranged alignment cam 40 which is rotatively mounted in journals 41 machined into the track frame 14. A tension link pivot pin 42 extends through a transverse bore formed in the alignment cam 40. In the embodiment illustrated in FIG. 3, the tension link pivot pin 42 and the alignment cam 40 are two separate parts, however these parts could be integrally formed into a single part. A bore perpendicular to the tension link pivot pin 42 is formed through the track frame pivot pin 42 and the alignment cam 40 for receiving an actuating arm 44. The actuating arm 44 extends upwardly from the alignment cam 40 and is provided with a yoke 47 that is pinned to a longitudinally extendible adjusting member 46 by clevis pin 48. Adjusting member 46 is a screw jack formed by a hollow shaft 50 having a sleeve 52 that encircles pin 48. The hollow shaft 50 has a threaded portion that engages threaded member 54. Threaded member 54 is mounted to the track frame 14 by a ball joint 56. The ball joint 56 is formed by a spherical portion 57 formed in the threaded member 54 that is trapped between two plates 59 extending into the hollow interior of the track frame 14 from one of its interior surfaces. The end of the threaded member 54 opposite the threaded portion is provided with a hex nut head 58 which can be rotated by a conventional wrench. The hex nut head 58 can be accessed through an opening formed in the track frame 14 for that purpose. It should be noted that the longitudinally extendible adjustment member 46 could comprise other suitable assemblies, such as electrically driven linear motors, hydraulic motors and other linear extendible mechanisms.

To adjust the toe-in/toe-out orientation of the idler 18, an operator takes a wrench and engages hex nut head 58. Rotating threaded member 54 drives hollow shaft 50 in a longitudinal direction. The hollow shaft 50 in turn shifts actuating arm 44 in a longitudinal direction rotating tension link pivot pin 42 and alignment cam 40. As shown in FIG. 3, the camming surfaces 60 of the alignment cam 40 are skewed with respect to the transverse axis defined by the tension link pivot pin 42. Therefore rotation of the alignment cam 40 twists the tension link 30 predominately about a vertical axis thereby adjusting the toe-in/toe-out orientation of the idler 18 relative to the track frame 14. Rotation of the alignment cam 40 also twists the tension link 30 to a lesser degree about a longitudinally extending horizontal axis.

The invention should not be limited to the above described embodiment, but should be limited solely by the claims that follow.

What is claimed is:

1. A track vehicle comprising:
a main frame;
a track frame mounted to the main frame
a drive wheel extending from the main frame for propelling the vehicle;
an idler spaced longitudinally from the drive wheel and rotatively mounted on the track frame;
a track entraining the drive wheel and idler;
a tension link being pivotally mounted to the track frame at a pivot, the idler is rotatively mounted to the tension link;
a linear motor is mounted to the tension link for pivoting the tension link relative to the track frame;
an alignment cam is mounted to the pivot to adjust the toe-in/toe-out orientation of the idler relative to the track frame;
a longitudinally extendible adjusting member rotates the alignment cam to control the toe-in/toe-out orientation of the idler.

2. A track vehicle as defined by claim 1 wherein the alignment cam is provided with an actuating arm which engages the adjusting member.

3. A track vehicle as defined by claim 2 wherein the adjusting member is a screw jack.

4. A track vehicle as defined by claim 3 wherein the tension link is pivoted on a tension link pivot pin that passes through the alignment cam, the tension link pivot pin defining a transverse axis.

5. A track vehicle as defined by claim 4 wherein the alignment cam is journalled in the track frame.

6. A track vehicle as defined by claim 5 wherein the adjusting member comprises a threaded portion that is mounted to the track frame by a ball joint.

7. A track vehicle as defined by claim 6 wherein the threaded portion of the adjusting member is provided with a hollow shaft that engages the threaded portion and moves in and out relative to the threaded portion when the threaded portion is rotated.

8. A track vehicle as defined by claim 7 wherein the actuating arm of the alignment cam comprises a yoke that is pivotally coupled to the hollow shaft by a clevis pin.

9. A track vehicle as defined by claim 8 wherein the yoke has an arm that extends into the alignment cam.

10. A track vehicle as defined by claim 9 wherein the alignment cam is substantially cylindrical and is angled with relation to the transverse axis defined by the tension link pivot pin.

11. An adjustment mechanism, the adjustment mechanism comprising:
a frame;
an alignment cam is pivotally mounted to the frame, the alignment cam being provided with a pivot pin;
a tension link pivot pin extends through the alignment cam and defines a transverse axis;
a tension link is pivotally mounted to the tension link pivot pin;
a wheel is rotatively mounted to the tension link;
a longitudinally extendible adjusting member extends between the frame and the alignment cam for rotating the alignment cam to control the toe-in/toe-out orientation of the wheel.

12. An adjustment mechanism as defined by claim 11 wherein the alignment cam is provided with an actuating arm which engages the adjusting member.

13. An adjustment mechanism as defined by claim 12 wherein the adjusting member is a screw jack.

14. An adjustment mechanism as defined by claim 13 wherein the adjusting member comprises a threaded portion that is mounted to the frame by a ball joint.

15. An adjustment mechanism as defined by claim 14 wherein the threaded portion of the adjusting member is provided with a hollow shaft that engages the threaded portion and moves in and out relative to the threaded portion when the threaded portion is rotated.

16. An adjustment mechanism as defined by claim 15 wherein the actuating arm of the alignment cam comprises an alignment yoke that is pivotally coupled to the hollow shaft by a clevis pin.

17. An adjustment mechanism as defined by claim 16 wherein the alignment yoke is provided with an arm that extends into the alignment cam.

18. An adjustment mechanism as defined by claim 17 wherein the alignment cam is substantially cylindrical and is angled with relation to the transverse axis defined by the tension link pivot pin.

19. An adjustment mechanism for a tracked vehicle, the adjustment mechanism comprising:
a frame;
an alignment cam is pivotally mounted to the frame, the alignment cam is provided with a tension link pivot pin, the tension link pivot pin defining a transverse axis;
a tension link is pivotally mounted to the tension link pivot pin;
a wheel is rotatively mounted to the tension link;
a longitudinally extendible adjusting member extends between the frame and the alignment cam for rotating the alignment cam to predominately rotate the wheel about a vertical axis relative to the frame.

20. An adjustment mechanism as defined by claim 19 wherein the alignment cam and the tension link pivot pin are two separate parts with the alignment cam being substantially cylindrical and the tension link pivot pin extending through the alignment cam.

\* \* \* \* \*